United States Patent

[11] 3,581,421

[72] Inventor William J. Raymond
 Des Plaines, Ill.
[21] Appl. No. 797,117
[22] Filed Feb. 6, 1969
[45] Patented June 1, 1971
[73] Assignee Berg-Warner Corporation
 Chicago, Ill.

[54] CODED VISUAL INFORMATION STORAGE UNIT
 2 Claims, 6 Drawing Figs.
[52] U.S. Cl. ............................................. 40/152
[51] Int. Cl. ......................................... G09f 11/00
[50] Field of Search .................................. 40/158, 64
 (A), 63 (A), 106.1, 152

[56] References Cited
 UNITED STATES PATENTS
 2,643,577 6/1953 Williams .................. 40/64A
 3,300,886 1/1967 Donofrio .................. 40/64A Primary Examiner—Robert W. Michell
Assistant Examiner—Wenceslao J. Contreras
Attorneys—Donald W. Banner, Lyle S. Motley, C. G. Stallings and William S. McCurry ABSTRACT: A program unit for an audiovisual educational device which incorporates a series of film transparencies integrated into assembly. The paddlelike assembly, or film slide, includes means for engaging a sprocket or other transport mechanism and coded aperture through which a pin may be selectively inserted either to prevent or permit incremental advancement of the film slide relative to a display station.

INVENTOR
WILLIAM J. RAYMOND
BY
ATTORNEY

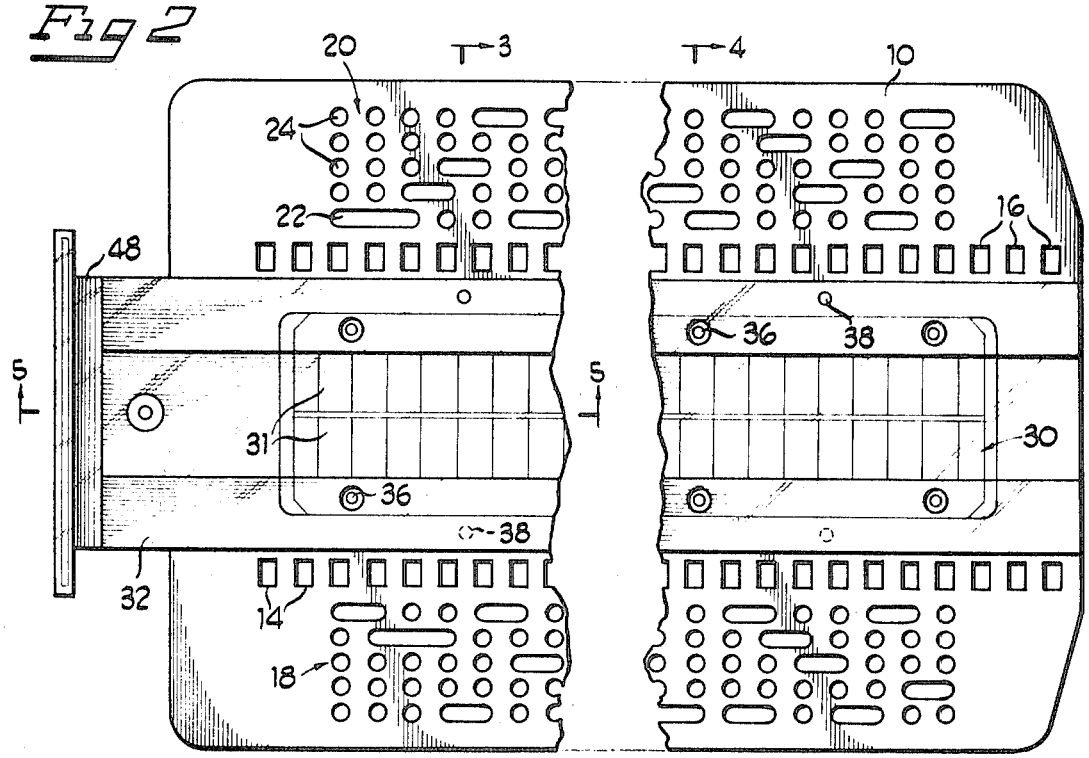
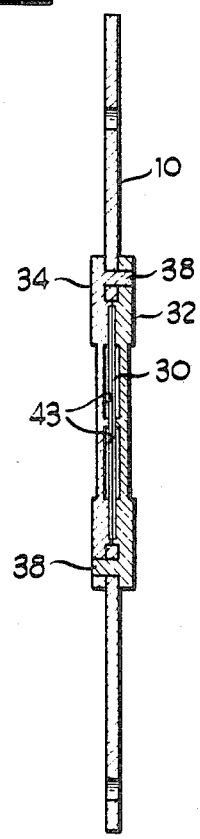
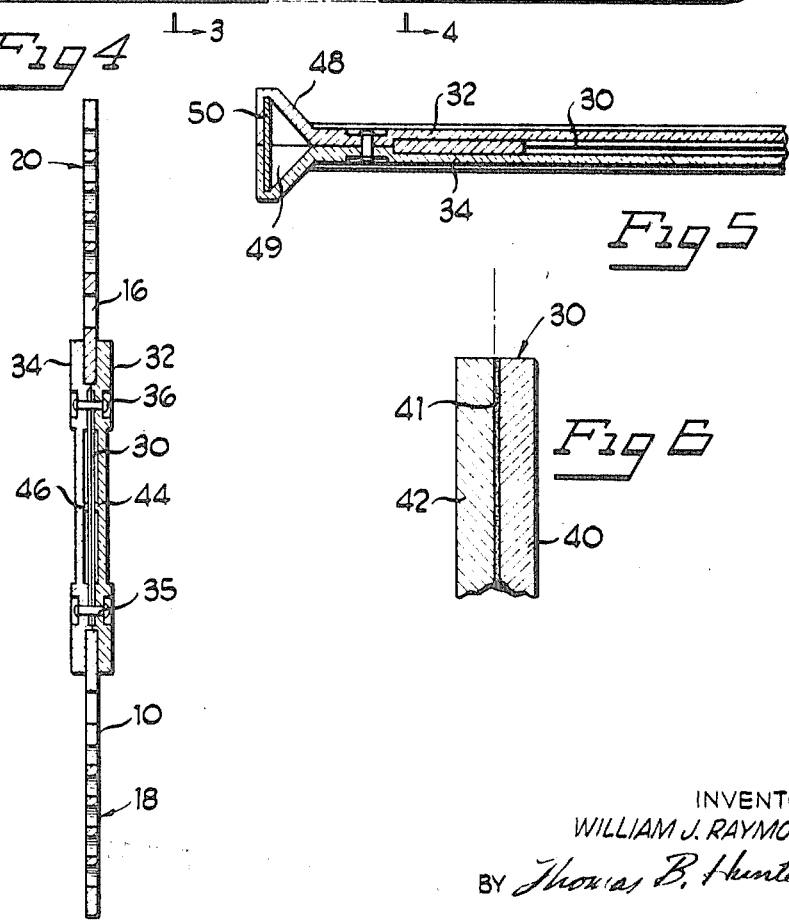
INVENTOR
WILLIAM J. RAYMOND
BY Thomas B. Hunter
ATTORNEY

CODED VISUAL INFORMATION STORAGE UNIT

BACKGROUND AND SUMMARY OF THE INVENTION

This invention relates generally to improved software for an audiovisual device, and, more particularly, to improvements in a coded visual component of the type described in U.S. Pat. application Ser. No. 615,547, filed Feb. 13, 1967.

As reference is made herein to the visual storage component, the unit described includes the following basic elements: (1) a rigid or semirigid baseplate, (2) a series of film transparencies supported by the baseplate in a fixed relationship, (3) a coded area, and (4) means for engaging a drive mechanism, for example, sprocket holes adapted to cooperate with a sprocket wheel.

One problem encountered in using transparencies, for example, a plurality of images arrayed on a single strip of 35 mm. film, is that the film must be held in a fixed predetermined position relative to the optical system through which the transparencies are projected onto a screen, or other display means. Even under the best of circumstances, the heat generated by the projection lamp tends to cause warping and buckling of the film resulting in distortion of the image on the display screen. It has been proposed to sandwich the film strip between two translucent sheets, however, the difference in the optical properties of the film and any conventional transparent sheet material, for example, optical quality thermoplastic strips, produce a phenomenon known as "Newton rings".

By means of the present invention, the film strip is supported in such a way that the distortion from heat and the "Newton rings" are avoided. This is accomplished by providing a relief in the supporting strip so that it does not directly engage the projected portion of the film. Also, the film is formed in a laminate with a sheet of Mylar (or other suitable transparent film) bonded to the emulsion side of the film strip. The thickness of the Mylar film is approximately the same as the thickness of standard 35 mm. film so that the emulsion side always lies in the optical center of the support.

It is, therefore, a principal object of the invention to provide a novel film support which is effective in preventing heat distortion of the film, and does not require an interface between the film and the adjacent transparent supporting strip.

Another object of the invention is to provide a simple and low cost visual information storage unit adapted for use in an audiovisual device which can be assembled easily, which protects the film from abrasion, and which can be manufactured from low cost materials such as thermoplastics. Additional objects and advantages will be apparent from reading the following detailed description taken from the drawings.

THE DRAWINGS

FIG. 2 is a fragmentary top plan view of the embodiment shown in FIG. 1;

FIG. 3 is a cross section view taken along the plane of line 3-3 of FIG. 2;

FIG. 4 is a cross section view taken along the plane of line 4-4 of FIG. 2;

FIG. 5 is a cross section view taken along the plane of line 5-5 of FIG. 2; and

FIG. 6 is a detailed cross section of the laminated film.

DETAILED DESCRIPTION OF THE INVENTION

Figure 1:
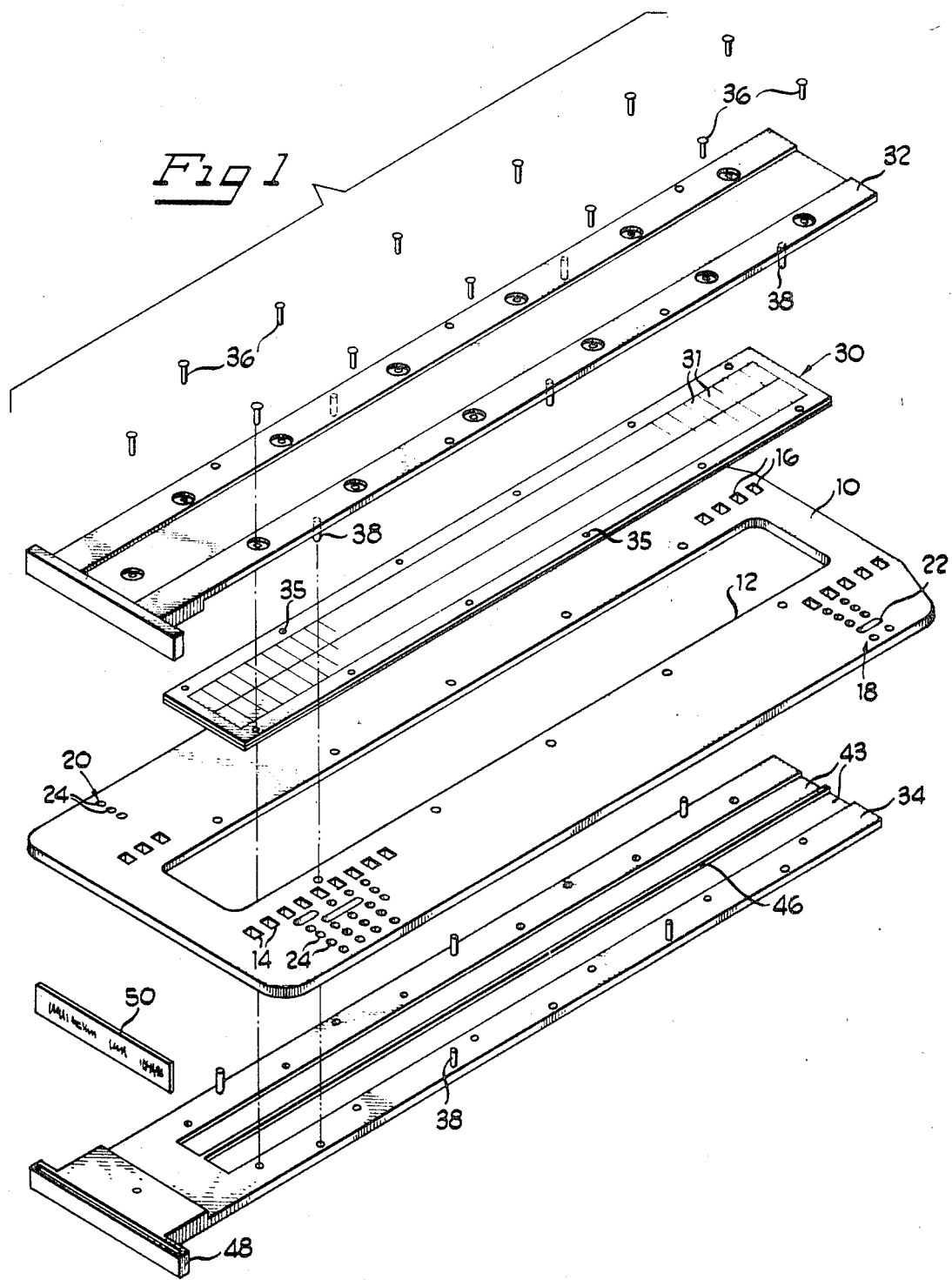
FIG. 1 is an exploded isometric view showing the preferred embodiment of the present invention.

Referring now to the drawings, the baseplate 10 comprises a flat, generally rectangular element having a thin cross section. The base plate 10 may be fabricated from a thin sheet of metal or thermoplastic material, such as impact polystyrene, (ABS) acrylonitrile-butadiene-styrene graft polymers, phenol-formaldehyde, and similar materials, including laminates. The essential characteristic required is that the base plate must be reasonably rigid so that it does not flex except under relatively moderate loads which are not normally encountered in operation. Satisfactory base plates have been made from ABS and fabric reinforced phenol-formaldehyde thermosetting resins.

The base plate 10 is provided with an elongated, centrally located opening 12 for the reception of the film strip in a manner which will be described in greater detail below. Along both sides of the opening 12 there are provided rows of sprocket holes 14, 16 which are adapted to receive the sprocket teeth on a drive sprocket (not shown) in the manner described in considerable detail in the aforementioned Ser. No. 615,547. It will be appreciated that as the baseplate indexes relative to a projection unit, different areas or frames of the film strip will be projected on the display screen.

The baseplate 10 is provided also with coded areas 18, 20 between the sprocket holes and the edge of the support member. These coded areas comprise a series of slots 22 or holes 24 into which a pin or other blocking member (not shown) is selectively inserted. In the event a pin is received within a hole, the support member cannot be advanced; whereas, if it is received in a slot, upon energization of the drive mechanism, the entire film slide may be advanced or driven until the pin engages the opposite end of the slot.

In the center opening 12, the film strip 30 is supported by means of two transparent supporting strips 32, 34 which are secured to each other through holes 35 in the film strip by rivets 36 or other suitable fastening means. The supporting strips 32, 34 are in turn secured to the baseplate by pins 38 to prevent any relative movement between the film strip and the baseplate.

Referring now to FIG. 6, it should be noted that the film strip 30 is in the form of a laminate comprising the film base 40 which has an emulsion layer 41 and a clear film 42 of Mylar or other material bonded directly to the emulsion side. The thickness of the protective film 42 is about equal to the thickness of the film base so that the emulsion lies directly in the plane bisecting the support member. This is important because in operation, the film slide is turned up side down after one-half of the program is completed so that no matter which orientation is being used, the emulsion layer always lies in the same plane relative to the optical projection system.

The center of the supporting strips adjacent to the film strip are provided with shallow recesses 43 so that there is no surface area in direct engagement with the images 31 being projected. In other words, the film strip is engaged only at the edge and along the center which divides the two separate strips of images. The major area is, therefore, not in engagement with the supporting strips, thus avoiding the possibility of "Newton rings". The recesses 43 form a rib 44 on supporting strip 32 and a corresponding rib 46 on supporting rib 34. These ribs are in tight engagement with the film strip at the medial portion thereof, thus providing additional support.

If desired, the film supporting strips 32 and 34 may be provided with flanges 48 at one end thereof so that they provide a slot 49 for the insertion of a level or other indicia 50. The latter can be used to identify the subject matter incorporated in the information storage unit.

While the subject invention has been described in connection with a certain specific embodiment thereof, it is to be understood that this is by way of illustration and not by way of limitation, and the scope of the appended claims should be construed as broadly as the prior art will permit.

What I claim is:

1. A visual information storage unit comprising: an elongated baseplate having a flat, generally thin cross section; means defining an elongated opening in said baseplate; a film strip supported in said opening, said film strip including a plurality of individual images reproduced on said strip in the form of transparencies, said transparencies being arranged in at least two parallel rows extending along the major dimension of said baseplate; means for securing said film strip to said baseplate including a pair of transparent supporting strips secured to said baseplate and holding said film strip therebetween, said supporting strips having surfaces contacting said film strip, but out of contact with said images, said supporting strips further including rib means engaging said film strip intermediate said rows.

2. Apparatus as defined in claim 1, wherein said film strip includes a protective film on the emulsion side of said transparencies, the interface lying in a plane equidistant from the outwardly facing surfaces of said baseplate.